UNITED STATES PATENT OFFICE.

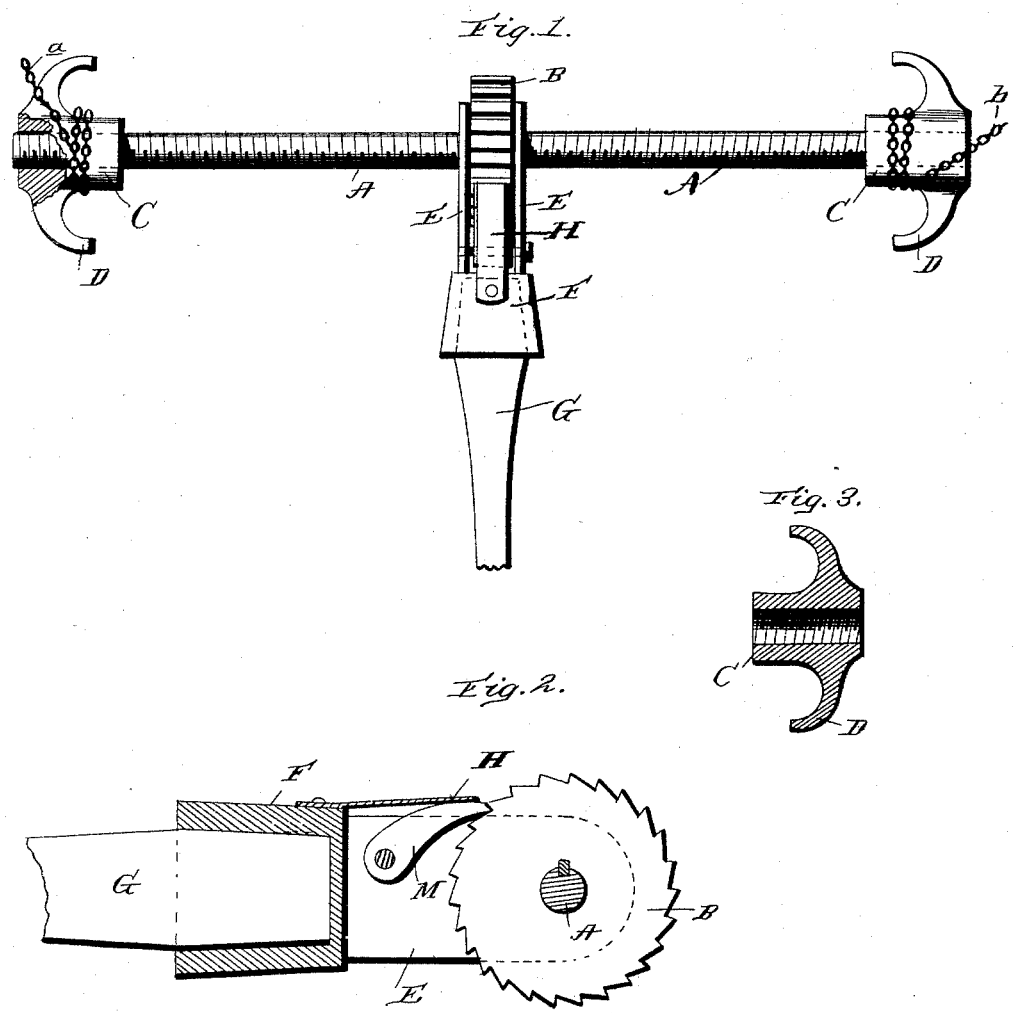

AMI HOPKINS, OF CENTRALIA, WASHINGTON.

STUMP-PULLER.

SPECIFICATION forming part of Letters Patent No. 468,344, dated February 9, 1892.

Application filed July 7, 1891. Serial No. 398,682. (No model.)

*To all whom it may concern:*

Be it known that I, AMI HOPKINS, a citizen of the United States, residing at Centralia, in the county of Lewis and State of Washington, have invented certain new and useful Improvements in Stump-Pullers; and I do declare the following to be a full, clear, and exact description of the invention, such as will enable others skilled in the art to which it appertains to make and use the same.

My invention has relation to improvements in stump-pullers, and the novelty will be fully understood from the following description and claims, when taken in conjunction with the accompanying drawings, in which—

Figure 1 is a plan view of my improved stump-puller in an operative position. Fig. 2 is a sectional detail view of the same, and Fig. 3 is a diametrical section of one of the burrs or nuts.

Referring by letter to the said drawings, A indicates the rotatable bar of my improved stump-puller, upon the middle of which a ratchet-wheel B is keyed or feathered, as better illustrated in Fig. 2 of the drawings.

As better illustrated in Fig. 1 of the drawings, the bar A is provided with oppositely-directed screw-threads, which respectively extend from the ends thereof to the ratchet-wheel B and are designed for a purpose presently to be described.

Mounted upon the respective ends of the threaded bar A are interiorly-threaded burrs or nuts C, which are provided with oppositely-directed radial hooks D, for a purpose presently to be described.

Pivotally connected to the bar A, at the sides of the ratchet-wheel B, are parallel bars E, which are connected to or formed integral with a socket F, in which is seated one end of a lever G, through the medium of which the threaded bar A is rotated, as will be presently described. Pivotally mounted between the parallel bars E is a pawl M, which is backed by a flat spring H, which is connected to the top of the socket F and serves to keep the pawl M in engagement with the ratchet-wheel.

By the construction described it will be readily perceived that when the bar A is rotated through the medium of the lever, pawl, and ratchet-wheel, as has been described, the burrs or nuts on the respective ends of said bar will approach the middle thereof by reason of the oppositely-directed threads.

In the operation of my improved stump-puller one of the burrs or nuts on the rotatable bar is connected to a suitable anchor by a chain *a*, as illustrated, and the other burr is connected by a chain *b* to the stump to be pulled. The bar A is then rotated, as has been described, when the burrs, approaching the middle of the said bar, will exert a draft upon the chains and finally pull the stump.

By the employment of the rotatable bar having two sets of oppositely-directed threads in conjunction with the burrs upon said bars it will be readily perceived that a great leverage is afforded, whereby a man of ordinary strength is enabled to pull a stump.

Having described my invention, what I claim, and desire to secure by Letters Patent, is—

In a stump-puller, the combination, with a rotatable bar having oppositely-directed screw-threads extending, respectively, from each of its ends to its middle and interiorly-threaded burrs or nuts mounted upon the ends of said bar and provided with oppositely-directed radial hooks, of a ratchet-wheel keyed or feathered upon the bar at the middle thereof, parallel bars pivotally connected to the threaded bar adjacent the sides of the ratchet-wheel, a pawl pivoted between the parallel bars and engaging the teeth of the ratchet-wheel, a socket connected to the outer ends of the parallel bars, a spring connected to said socket and bearing upon the pawl, and a lever seated in the socket, all adapted to operate substantially as specified.

In testimony whereof I affix my signature in presence of two witnesses.

AMI HOPKINS.

Witnesses:
M. T. CURRY,
GEORGE WASHINGTON.